United States Patent
Okamoto

(10) Patent No.: US 10,671,274 B2
(45) Date of Patent: Jun. 2, 2020

(54) MEDICAL IMAGE DISPLAY APPARATUS AND PROGRAM

(71) Applicant: Konica Minolta, Inc., Chiyoda-ku, Tokyo (JP)

(72) Inventor: Yukiko Okamoto, Yokohama (JP)

(73) Assignee: KONICA MINOLTA, INC., Tokyo (JP)

(*) Notice: Subject to any disclaimer, the term of this patent is extended or adjusted under 35 U.S.C. 154(b) by 23 days.

(21) Appl. No.: 15/963,514

(22) Filed: Apr. 26, 2018

(65) Prior Publication Data

US 2018/0314415 A1    Nov. 1, 2018

(30) Foreign Application Priority Data

Apr. 26, 2017 (JP) ................. 2017-087031

(51) Int. Cl.
| | |
|---|---|
| *G06F 3/0488* | (2013.01) |
| *G06T 15/08* | (2011.01) |
| *G06T 7/00* | (2017.01) |
| *G06F 3/0484* | (2013.01) |

(52) U.S. Cl.
CPC ........ *G06F 3/04883* (2013.01); *G06F 3/0484* (2013.01); *G06F 3/04845* (2013.01); *G06T 7/0014* (2013.01); *G06T 15/08* (2013.01)

(58) Field of Classification Search
CPC ............... G06F 3/04883; G06F 3/0484; G06F 3/04845; G06T 15/08; G06T 7/0014
See application file for complete search history.

(56) References Cited

U.S. PATENT DOCUMENTS

| | | | | |
|---|---|---|---|---|
| 7,605,804 | B2 * | 10/2009 | Wilson ................. | G06F 3/0488 345/173 |
| 2017/0090675 | A1 * | 3/2017 | Lee ....................... | A61B 8/465 |
| 2018/0217379 | A1 * | 8/2018 | Nishizawa ............. | G06F 1/163 |
| 2018/0232053 | A1 * | 8/2018 | Hamabata ............. | B60K 37/06 |
| 2018/0253212 | A1 * | 9/2018 | Oliver ................. | G06F 3/04812 |

FOREIGN PATENT DOCUMENTS

JP    2016126407 A    7/2016

* cited by examiner

*Primary Examiner* — Kent W Chang
*Assistant Examiner* — Andrew Lee
(74) *Attorney, Agent, or Firm* — Cantor Colburn LLP

(57) ABSTRACT

A medical image display apparatus includes: a touch screen that displays a medical image and detects a touch position touched by a user; and a hardware processor that controls to display a marker on the medical image at a position separated from the touch position detected on the touch screen by a separation distance, wherein the hardware processor sets a reference point on the medical image, calculates a rotation angle of the touch position with respect to the reference point as a center, sets a position separated from the touch position by the separation distance in a direction corresponding to the rotation angle as a trace position, and controls to display the marker at the trace position.

3 Claims, 6 Drawing Sheets

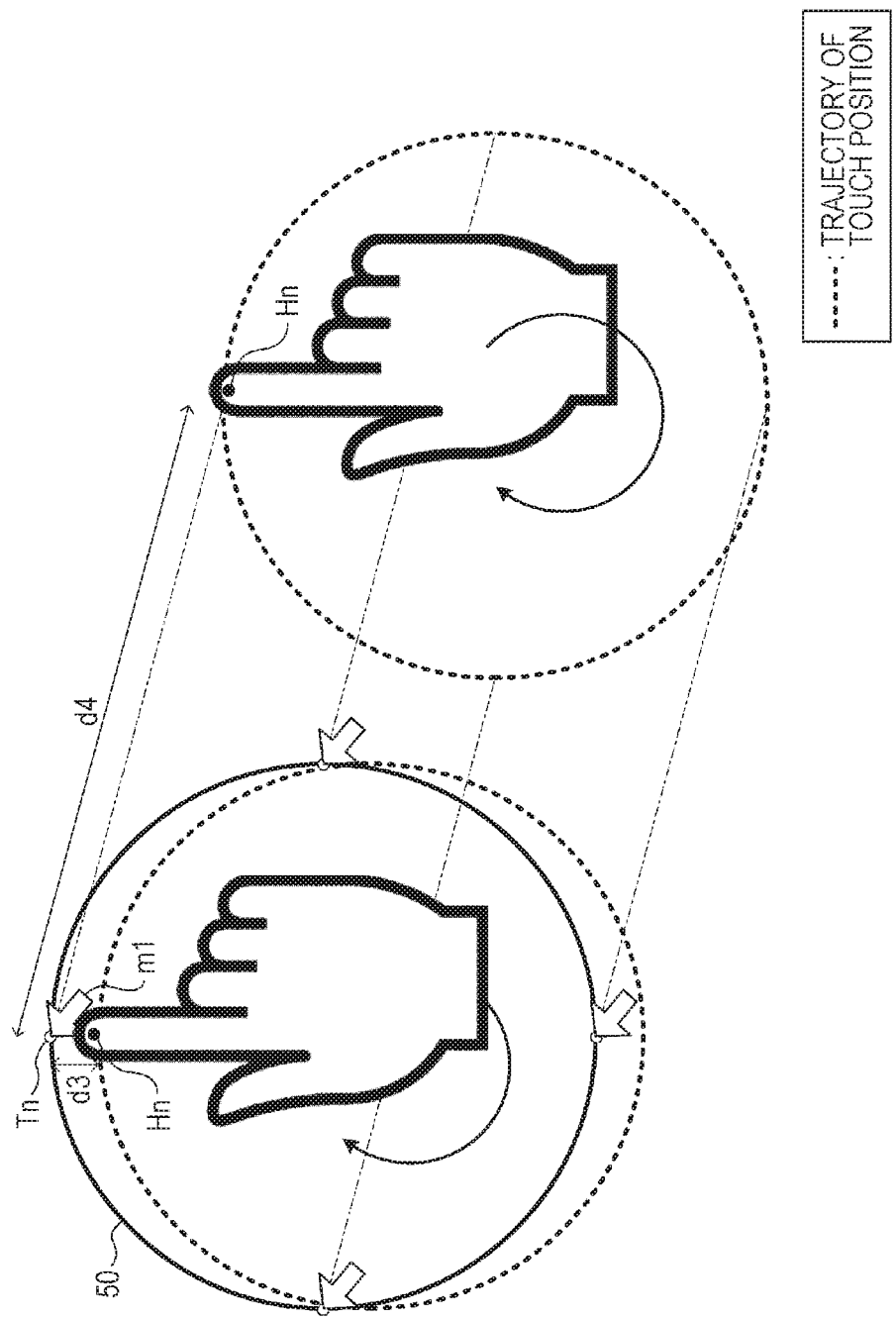

MEDICAL IMAGE DISPLAY APPARATUS AND PROGRAM

CROSS REFERENCE TO RELATED APPLICATION

The present application claims priority under 35 U.S.C. § 119 to Japanese Application No. 2017-087031, filed on Apr. 26, 2017, the entire contents of which are incorporated herein by reference.

BACKGROUND

Technological Field

The present invention relates to a medical image display apparatus and a program.

Description of the Related Art

A medical image display apparatus that displays medical images such as ultrasound images and X-ray images measures the size including the length and the area of a measurement target region such as an organ or a site in response to the designation of the region by a user. While a medical image display apparatus equipped with a touch screen enables designation of the region by touch operation, there is a case that displaying a marker such as a cursor at a position touched by the user causes a user's finger to overlap with the marker or the measurement target region, hindering visibility.

To overcome this issue, there is a proposed method of displaying the marker at a position distant from the touch position to enable touch operation while checking the marker and a region-of-interest (for example, refer to JP 2016-126407A).

In a case, however, where an outline of a closed region is to be traced, it is difficult to avoid overlapping of the finger with the marker or the measurement target region even with a separation distance from the touch position depending on the length of the separation distance and the shape of the measurement target region. While the finger overlapping can be avoided with the setting of the separation distance equivalent to the size of the measurement target region, this needs a display screen twice as large as the area of the measurement target region, leading to difficulty in implementation depending on the size of the target organ or the like.

SUMMARY

An object of the present invention is to enhance operability in tracing by touch operation.

To achieve the abovementioned object, according to an aspect of the present invention, a medical image display apparatus reflecting one aspect of the present invention comprises:

a touch screen that displays a medical image and detects a touch position touched by a user; and a hardware processor that controls to display a marker on the medical image at a position separated from the touch position detected on the touch screen by a separation distance, wherein the hardware processor sets a reference point on the medical image, calculates a rotation angle of the touch position with respect to the reference point as a center, sets a position separated from the touch position by the separation distance in a direction corresponding to the rotation angle as a trace position, and controls to display the marker at the trace position.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating a comparative example of tracing.

DETAILED DESCRIPTION OF EMBODIMENTS

Hereinafter, one or more embodiments of a medical image display apparatus and a program according to the present invention will be described with reference to the drawings. However, the scope of the invention is not limited to the disclosed embodiments.

Figure 1:
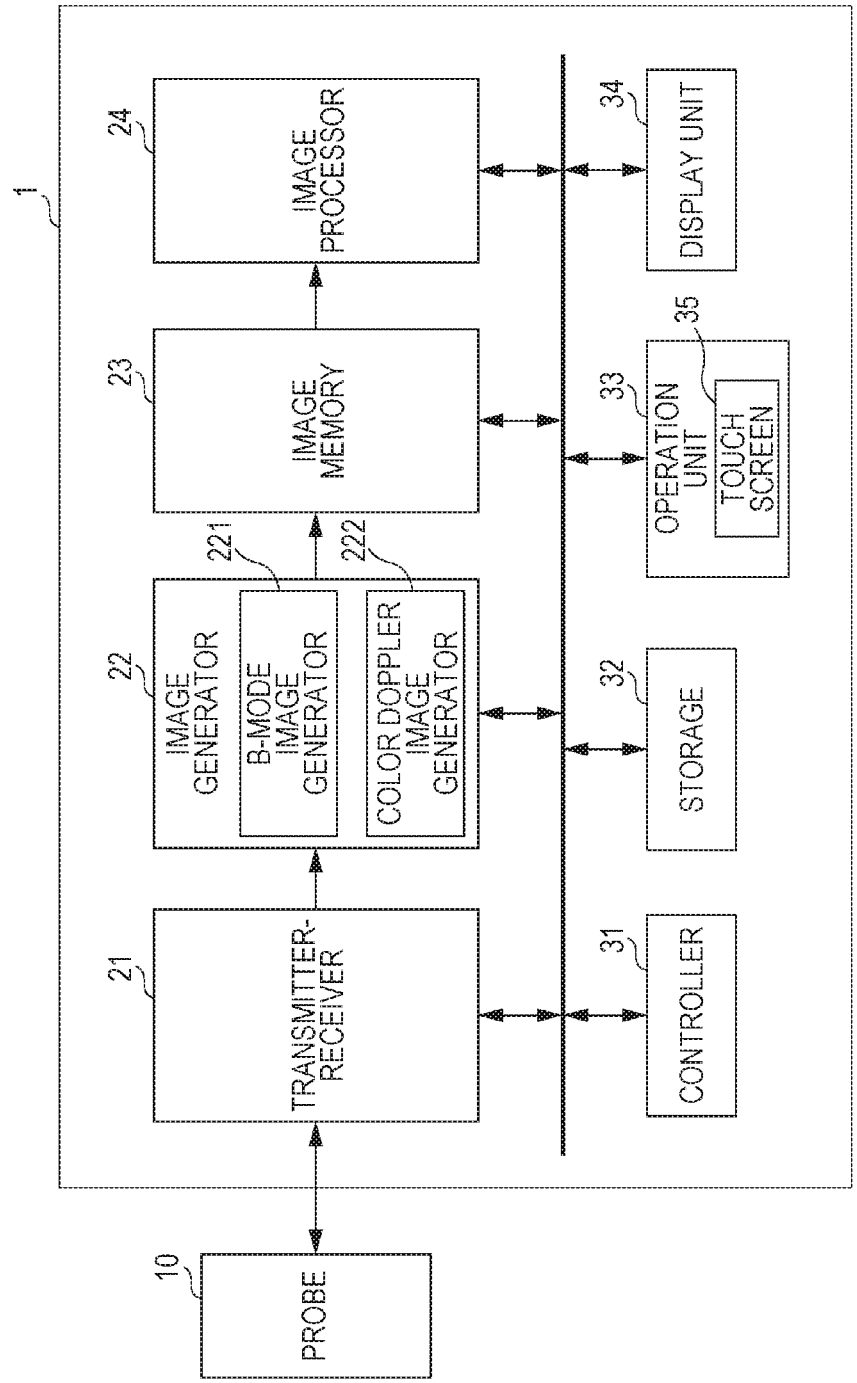
FIG. 1 is a block diagram illustrating a main configuration of an ultrasound diagnostic apparatus according to an embodiment of the present invention for individual functions.

FIG. 1 illustrates a configuration of an ultrasound diagnostic apparatus as an embodiment of the medical image display apparatus of the present invention for individual functions.

As illustrated in FIG. 1, an ultrasound diagnostic apparatus 1 is connectable to a probe 10, and includes a transmitter-receiver 21, an image generator 22, an image memory 23, an image processor 24, a controller 31, a storage 32, an operation unit 33, and a display unit 34.

While the probe 10 is connected with the ultrasound diagnostic apparatus 1 via a cable in a typical configuration, it is allowable to configure to connect the probe 10 with the ultrasound diagnostic apparatus 1 via wireless communication.

The probe 10 includes a plurality of transducers arranged one-dimensionally or two-dimensionally. An example of applicable transducer is a piezoelectric element. In response to a drive signal output from the transmitter-receiver 21, the probe 10 transmits ultrasound waves corresponding to the drive signal by each of transducers to scan the interior of a subject with ultrasound waves. The probe 10 also receives a reflected wave from the subject to which the ultrasound wave has been transmitted, converts the reflected wave into an electric signal, and outputs the electric signal.

The probe 10 has no particular structural limitation and may be any type including a convex, linear, and may have a structure including a plurality of oscillating one-dimensionally arrayed transducers. The probe 10 may use any of scanning methods of an electronic scanning method, a mechanical scanning method, or the like.

The transmitter-receiver 21 generates a drive signal and outputs the generated signal to the probe 10 and causes the probe 10 to transmit ultrasound waves. In generating a tomogram, for example, the transmitter-receiver 21 transmits the drive signal with delay for each of the transducers of the probe 10 in accordance with a delay pattern instructed by the controller 31, so as to drive each of the transducers in turn to transmit ultrasound waves.

In addition, the transmitter-receiver 21 amplifies the electric signal of the reflected wave output from the probe 10, performs A/D conversion on the signal, and applies a delay time corresponding to each of the transducers and performs summing (delay-and-sum) to generate scan line data (acoustic line data). The transmitter-receiver 21 can generate at least one piece of scan line data by the ultrasound waves transmitted in one delay pattern.

The image generator 22 generates an ultrasound image from each of the pieces of scan line data generated in the transmitter-receiver 21.

While the image generator 22 illustrated in FIG. 1 includes a B-mode image generator 221 that generates a B-mode image as a tomogram and a color Doppler image generator 222 that generates a color Doppler image, there is no limitation in the type of ultrasound image generated by the image generator 22. For example, the image generator 22 may generate an A-mode image, a pulse Doppler image, a continuous wave Doppler image, or the like.

The B-mode image generator 221 performs processing such as logarithmic amplification and envelope detection on each of pieces of the scan line data, converts the amplitude intensity of each of pieces of the processed scan line data into luminance so as to generate a two-dimensional tomographic B-mode image.

The color Doppler image generator 222 performs frequency analysis on reflected wave data to extract signal components of a fluid tissue such as blood flow and a contrast medium, so as to generate a color Doppler image with average velocity, distribution, power, or the like of the fluid tissue expressed in color.

The image memory 23 is a memory that stores an ultrasound image generated by the image generator 22 in association with patient information. Patient information is patient identification information such as patient ID and name.

The image processor 24 reads an ultrasound image from the image memory 23 and applies image processing on the image as necessary. For example, the image processor 24 can perform image processing of emphasizing a region-of-interest (ROI) and image processing of superimposing the color Doppler image generated by the color Doppler image generator 222 on the B-mode image generated by the B-mode image generator 221. In addition, the image processor 24 can also generate a three-dimensional image from a plurality of B-mode images and perform volume rendering, surface rendering or the like on the image to generate a two-dimensional image expressed stereoscopically.

The controller 31 reads various control programs from the storage 32 and executes them to control individual components of the ultrasound diagnostic apparatus 1. The controller 31 can be constituted with a processor such as a central processing unit (CPU), graphics processing unit (GPU) and a random access memory (RAM).

For example, the controller 31 generates a delay pattern in the drive signal according to the type of an ultrasound image to be displayed, outputs the pattern to the transmitter-receiver 21, causes the image generator 22 to generate an ultrasound image, and controls to store the ultrasound image in the image memory 23. In addition, the controller 31 causes the image processor 24 to perform image processing on the ultrasound image stored in the image memory 23.

Moreover, when the user performs touch operation on the touch screen 35 to trace a size measurement target region such as an organ and a site, the controller 31 controls to display a marker on the ultrasound image displayed on the touch screen 35 at a position separated from the touch position detected on the touch screen 35 by a separation distance. Specifically, the controller 31 sets a reference point on the ultrasound image and calculates a rotation angle of the touch position with respect to the reference point as a center. The controller 31 sets a position separated from the touch position by a separation distance in a direction corresponding to the calculated rotation angle as a trace position and controls to display the marker at the trace position.

The storage 32 stores a program readable by the controller 31, a file to be used at execution of programs, or the like. An applicable example of the storage 32 is a large capacity memory such as a hard disk or a read only memory (ROM).

The operation unit 33 is a device used to input an instruction from the user, generates an operation signal according to the user's operation, and outputs the signal to the controller 31. As illustrated in FIG. 1, while the operation unit 33 includes the touch screen 35 integrated with the display unit 34, it is also possible to use a general input device such as a mouse, a keyboard, a track ball, a foot switch, a joystick, a click wheel together with the touch screen 35.

The display unit 34 displays an ultrasound image in accordance with display control of the controller 31. Applicable examples of the display unit 34 include a liquid crystal display (LCD), an organic electroluminescence display (OELD) in addition to the above-described touch screen 35.

With the ultrasound diagnostic apparatus 1, it is possible to enhance operability in tracing an outline or the like of the size measurement target region by touch operation on an ultrasound image displayed on the touch screen 35.

Figure 2:
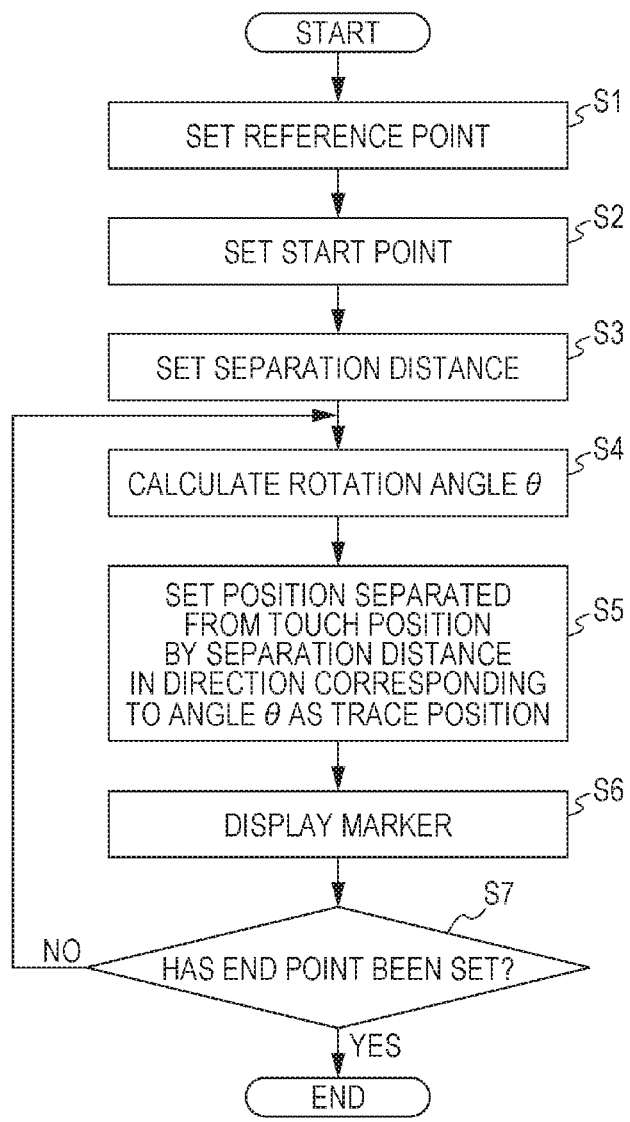
FIG. 2 is a flowchart illustrating a processing procedure in tracing on the ultrasound diagnostic apparatus.

FIG. 2 illustrates a processing procedure of tracing by touch operation on the ultrasound diagnostic apparatus 1.

As illustrated in FIG. 2, the ultrasound diagnostic apparatus 1 displays an ultrasound image on the touch screen 35 under the display control of the controller 31. In response to user's touch operation on the touch screen 35, the controller 31 sets a reference point on an ultrasound image (step S1).

Figure 3:
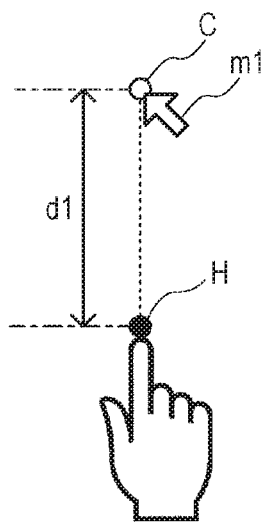
FIG. 3 is a diagram illustrating a reference point setting example.

FIG. 3 illustrates an example of setting the reference point.

As illustrated in FIG. 3, when the controller 31 detects a touch position H touched by the user on the touch screen 35, the controller 31 controls to display a marker m1 indicating a reference point C at a position distant from the touch position H by a fixed distance d1 in the vertical direction above the display screen. With the movement of the user's touch position H, the controller 31 controls to move the marker m1 following the moved touch position H while maintaining a positional relationship between the touch position H and the marker m1. Thereafter, after an instruction to confirm the position of the reference point C has been input from the operation unit 33, the controller 31 sets a current position of the marker m1 as the position of the reference point C.

As described above, while separating the touch position H and the marker m1 from each other by the fixed distance d1 facilitates user's instruction of the position of the reference point C because there is no overlapping of the user's finger during touch operation on the reference point C to be set, it is also allowable to set the user's touch position H as the reference point C.

Like the reference point, the controller 31 sets a start point of the trace on the ultrasound image (step S2). Next, the controller 31 sets the separation distance between the touch position and the trace position (step S3). For example, the user may touch a position distant from the start point by a distance to be set as the separation distance, and then, the controller 31 may set the distance between the start point and the first touch position as the separation distance.

When the user starts tracing by moving the touch position after the separation distance is set, the controller 31 calculates a rotation angle of the touch position with respect to the reference point as a center at a touch position after a fixed period of time from the start, for example, after three milliseconds (step S4). Specifically, the controller 31 sets a reference line having a rotation angle of zero degrees passing through the reference point, and calculates the rotation angle of the touch position from the reference line. As long as the reference line passes through the reference point, the reference line may be a line passing through the reference point and the first touch position at the start of tracing, or may be a line passing through the reference point in the vertical direction or the horizontal direction of the display screen.

The controller 31 sets a position separated from the touch position by a set separation distance in a direction corresponding to the calculated rotation angle as a trace position after a fixed period of time (step S5). The controller 31 controls to display a marker indicating the trace position at the set trace position and displays another marker indicating a trajectory of the trace between the trace position set immediately before and the trace position set this time (step S6).

During a period when the user traces while moving the touch position, the controller 31 repeats the above-described processing of steps S4 to S6 at each of the touch positions detected on the touch screen 35 at fixed time intervals (step S7: NO, S4 to S6). When the user completes tracing to a target position and inputs an instruction to set an end point on the operation unit 33 (step S7: YES), the current processing is finished.

Figure 4A:
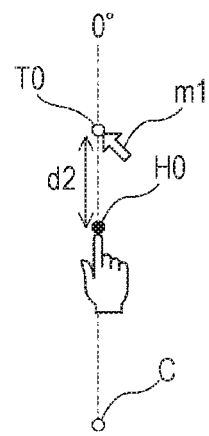
FIG. 4A is a diagram illustrating a first touch position at the start of tracing.
Figure 4B:
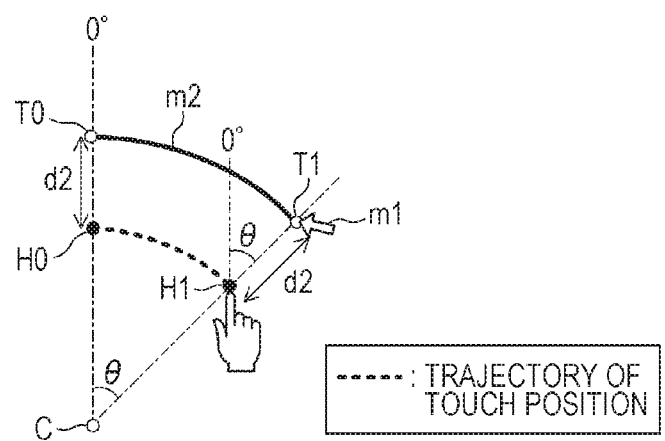
FIG. 4B is a diagram illustrating a touch position after a fixed period of time from the start of tracing.
Figure 4C:
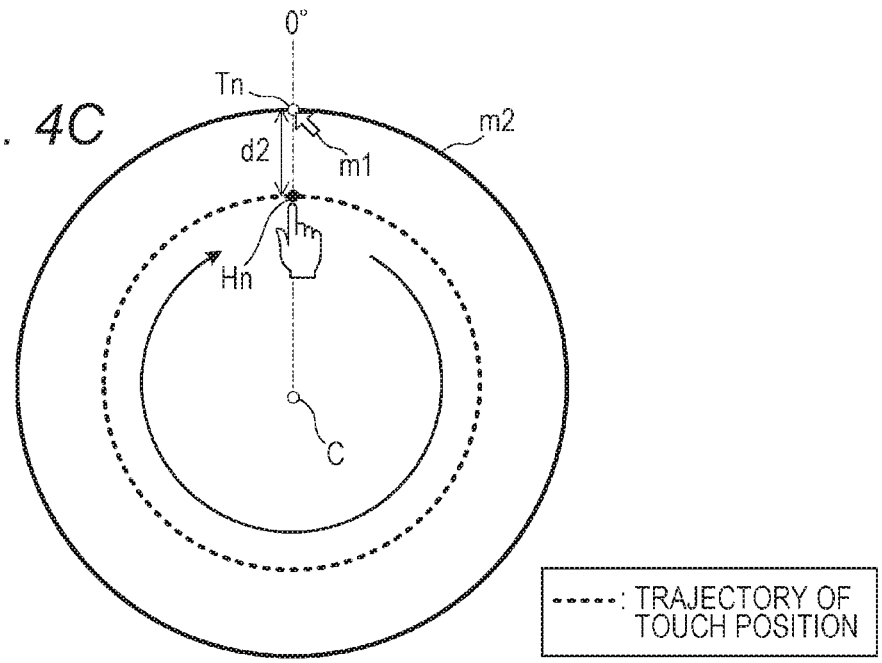
FIG. 4C is a diagram illustrating a touch position when an end point is set.

FIG. 4A to FIG. 4C illustrate an example of tracing.

As illustrated in FIG. 4A, the controller 31 sets the reference point C and a start point T0, and then, controls to display the marker m1 indicating the current trace position at the start point T0 since the start point T0 is the first trace position. While the marker m1 in FIG. 4A is arrow-shaped, the shape is not particularly limited as long as it can indicate the position of the start point T0, and may be a cursor or may have a shape such as a pin, or a balloon. It is also allowable to display a marker to indicate the position of the reference point C at the reference point C. Thereafter, after detecting a first touch position H0 on a line connecting the reference point C and the start point T0, the controller 31 sets a distance d2 from the start point T0 to the touch position H0 as the separation distance.

At a point after a fixed period of time elapsed from the point when the user starts tracing at the first touch position H0, the controller 31 defines a rotation angle on the line connecting the reference point C and the first touch position H0 as 0° and calculates an angle θ of rotation of the touch position H1 after the fixed period of time with respect to the reference point C as a center, as illustrated in FIG. 4B. The controller 31 sets the position separated from the touch position H1 by the set separation distance d2 in a direction rotated by the angle θ with respect to the touch position H1 as a center, as a trace position T1, and controls to move the marker m1 to the trace position T1. Moreover, as illustrated in FIG. 4B, the controller 31 controls to display a marker m2 indicating a trajectory of the trace between the start point T0 as the first trace position and the trace position T1 obtained after a fixed period of time. The marker m2 may be a straight line connecting the trace positions T0 and T1 or a curve obtained by interpolating between the trace positions T0 and T1.

During continued tracing by the user, the controller 31 repeats the above-described control of setting the trace position and displaying the markers m1 and m2 at each of touch positions detected at fixed time intervals on the touch screen 35. Then, as illustrated in FIG. 4C, the user finishes circular tracing to reach a touch position Hn and inputs from the operation unit 33 an instruction to set a trace position Tn being a same position as the start point T0 as an end point, and then, the controller 31 controls to display the circular marker m2 connecting the trace positions T0 to Tn. With this marker m2, a circular closed region can be designated as a region-of-interest.

While the above example is a case where the first touch position exists between the start point and the reference point, and the marker is displayed at the trace position point outside the trajectory of the touch position, there are cases where the first touch position exists on a side opposite to the reference point across the start point to display the marker at a trace position inside the trajectory of the touch position.

Moreover, while this is an example in which the reference point is set to the inner center of the measurement target region, it is also possible to set the reference point outside the measurement target region. Also in this case, the trace position can be determined corresponding to the rotation angle with respect to the reference point as a center to display the marker.

Furthermore, while the above-described example is a case where the controller 31 determines the direction of setting the trace position T1 from the touch position H1 as the direction of the rotation angle θ from the reference line of the rotation angle 0°, the direction is not limited to this example as long as the direction is a direction corresponding to the rotation angle θ.

Figure 5:
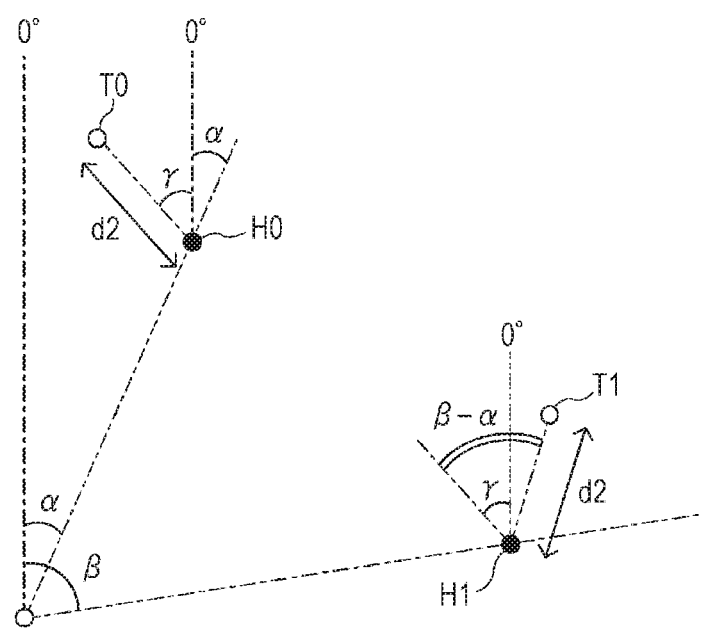
FIG. 5 is a diagram illustrating an example of setting another trace position.

FIG. 5 illustrates an example of setting another trace position.

In the example illustrated in FIG. 5, the first touch position H0 is rotated by an angle α, and the start point T0 being the first trace position is counter-rotated by an angle γ. The rotation direction is clockwise, and the counter-rotation direction is counterclockwise. The touch position H1 after a fixed period of time is rotated by an angle β from the reference line of the rotation angle 0° and rotated by an angle (β−α) from the immediately preceding touch position H0. The controller 31 can set the trace position T1 at a position separated from the touch position H1 by the distance d2 in the direction counter-rotated by the angle γ with respect to the touch position H1 as a center and further rotated from the position by the angle (β−α).

As described above, the ultrasound diagnostic apparatus 1 according to the present embodiment includes the touch screen 35 that displays an ultrasound image and detects the touch position touched by the user, and the controller 31 that controls to display the marker at a position separated from the touch position detected on the touch screen 35 by a separation distance. The controller 31 sets a reference point on the ultrasound image and calculates the rotation angle of the touch position with respect to the reference point as a center, and then, sets the position separated from the touch position by the separation distance in the direction corresponding to the calculated rotation angle as a trace position, so as to control to display the marker at the trace position.

Since the trace position is set corresponding to the rotation angle of the touch position with respect to the reference point as a center, it is possible to separate the trace position from the touch position with no necessity to prepare a large region for touch operation. With this configuration, it is possible to observe the region to be traced while tracing the region such as an organ and site as the target of size measurement, leading to enhancement of operability in the tracing by touch operation.

FIG. 6 illustrates an example of conventional tracing as a comparative example.

As illustrated in FIG. 6, in the case of tracing a circular region 50 in a conventional method, the positional relationship between the touch position Hn and the trace position Tn is fixed while the two positions are merely separated from each other. Accordingly, with a short separation distance d3 between the touch position Hn and the trace position Tn, the finger during touch operation overlaps with the marker m1 and the region 50 to hinder the visibility due to the short distance between the trace position Tn and the touch position Hn. On the other hand, while it would be possible to separate the trace position Tn from the touch position Hn with a long separation distance d4 to increase the visibility in observing the region 50, there is a need to prepare a touch operation region having the same area as the region 50 at a position not overlapping with the region 50. This makes it difficult to perform tracing when the size of the region 50 is too large.

In comparison, according to the present embodiment, the trace position is set corresponding to the rotation angle of the touch position with respect to the reference point as a center, making it possible to separate the trace position from the touch position without increasing the separation distance and without a need to prepare a large operation region.

The above-described embodiment is a preferred example of the present invention, and the present invention is not limited thereto. The embodiments can appropriately be modified without departing from the scope and spirit of the present invention.

For example, the controller 31 may set the distance input by the user on the operation unit 33 as the separation distance instead of setting the separation distance by the first touch position after setting the start point. Alternatively, the controller 31 may set statistical values such as an average value and a median value of the separation distance set in the past as the current separation distance.

In this case, the user may touch the start point and move the touch position to a surrounding portion. The controller 31 may execute the above processing procedure at a timing of separating from the starting point by the set separation distance as the timing of starting the tracing and with the position separated from the starting point by the separation distance as the first touch position.

In addition, while the above description is an example of the ultrasound diagnostic apparatus 1 that displays a marker indicating the current trace position and a marker indicating the trajectory of the tracing position together with the ultrasound image, this type of tracing is also used in other medical images such as an X-ray image or a magnetic resonance imaging (MRI) image, and thus, the present invention is also applicable generally to medical image display apparatuses that display medical images in addition to ultrasound diagnostic apparatuses.

As a computer readable medium for the program, it is possible to apply a non-volatile memory such as a ROM, a flash memory, and a portable recording medium such as a CD-ROM. Moreover, carrier waves are also applied as a medium for providing program data via a communication line.

Although embodiments of the present invention have been described and illustrated in detail, the disclosed embodiments are made for purposes of illustration and example only and not limitation. The scope of the present invention should be interpreted by terms of the appended claims.

What is claimed is:

1. A medical image display apparatus comprising:
a touch screen that displays a medical image and detects a touch position touched by a user; and
a hardware processor that controls to display a marker on the medical image at a position separated from the touch position detected on the touch screen by a separation distance,
wherein the hardware processor sets a reference point on the medical image, calculates a rotation angle of the touch position with respect to the reference point as a center, sets a position separated from the touch position by the separation distance in a direction corresponding to the rotation angle as a trace position, and controls to display the marker at the trace position, and
wherein the hardware processor sets a start point of tracing on the medical image, and sets a distance between the start point and a first touch position at the start of tracing as the separation distance.

2. A medical image display apparatus comprising:
a touch screen that displays a medical image and detects a touch position touched by a user; and
a hardware processor that controls to display a marker on the medical image at a position separated from the touch position detected on the touch screen by a separation distance,
wherein the hardware processor sets a reference point on the medical image, calculates a rotation angle of the touch position with respect to the reference point as a center, sets a position separated from the touch position by the separation distance in a direction corresponding to the rotation angle as a trace position, and controls to display the marker at the trace position, and
wherein the hardware processor controls to display the marker at each of touch positions detected at fixed time intervals on the touch screen while the user performs tracing while moving the touch position.

3. A non-transitory recording medium storing a computer readable program causing a computer to perform:
(a) displaying a medical image on a touch screen;
(b) displaying a marker on the medical image at a position separated from a touch position detected on the touch screen by a separation distance,
wherein (b) further includes:
(b1) setting a reference point and a start point of tracing on the medical image;
(b2) calculating a rotation angle of the touch position with respect to the reference point as a center; and
(b3) setting a position separated from the touch position by the separation distance in a direction corresponding to the calculated rotation angle as a trace position, setting a distance between the start point and a first touch position at the start of tracing as the separation distance and displaying the marker at the trace position.

\* \* \* \* \*